(12) United States Patent
Nesbitt

(10) Patent No.: US 6,321,249 B1
(45) Date of Patent: Nov. 20, 2001

(54) DYNAMIC SYSTEM CONFIGURATION USING AN OBJECT-BASED CLIENT-SERVER SYSTEM

(75) Inventor: David P. Nesbitt, Redondo Beach, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/066,767

(22) Filed: Apr. 28, 1998

(51) Int. Cl.[7] .................................................. G06F 15/16
(52) U.S. Cl. ..................... 709/202; 709/204; 709/220; 709/317; 709/330; 707/103
(58) Field of Search ...................... 709/200–204, 709/217–220, 223–224, 227–229, 315, 317–318, 330, 332; 707/9–10, 103–104; 711/100

(56) References Cited

U.S. PATENT DOCUMENTS

| | | | | |
|---|---|---|---|---|
| 5,315,703 | * | 5/1994 | Matheney et al. | 345/507 |
| 5,329,619 | * | 7/1994 | Pag'e et al. | 709/203 |
| 5,475,819 | * | 12/1995 | Miller et al. | 709/203 |
| 5,491,796 | * | 2/1996 | Wanderer et al. | 709/224 |
| 5,592,664 | * | 1/1997 | Starkey | 707/1 |
| 5,678,041 | * | 10/1997 | Baker et al. | 709/229 |
| 5,752,159 | * | 5/1998 | Faust et al. | 455/5.1 |
| 5,812,779 | * | 9/1998 | Ciscon et al. | 709/223 |
| 5,872,973 | * | 2/1999 | Mitchell et al. | 709/332 |
| 5,948,054 | * | 9/1999 | Nielsen | 709/200 |
| 5,978,815 | * | 11/1999 | Cabrera et al. | 707/204 |
| 5,999,975 | * | 12/1999 | Kittaka et al. | 709/229 |
| 6,016,504 | * | 1/2000 | Arnold et al. | 709/200 |
| 6,055,063 | * | 4/2000 | Yang et al. | 709/201 |
| 6,061,738 | * | 5/2000 | Osaku et al. | 709/245 |
| 6,108,700 | * | 8/2000 | Maccabee et al. | 709/224 |
| 6,175,839 | * | 1/2001 | Takao et al. | 709/203 |

\* cited by examiner

*Primary Examiner*—Bharat Barot
*Assistant Examiner*— .
(74) *Attorney, Agent, or Firm*—Oliff & Berridge, PLC

(57) ABSTRACT

A method and apparatus are provided to enable other system elements to obtain configuration attribute modifications from a print management system. An attribute broker provides two methods, register and advertise, to facilitate necessary configuration changes. The register method is called by other system elements to indicate an interest in a particular attribute. In registering interest in an attribute, the system element provides a callback function. The attribute broker maintains a list of all attributes that have been registered and keeps the set of callback functions for each registered attribute. Whenever a server configuration attribute is modified, the server object uses the advertise method to provide the attribute information to any system element that has registered interest in that attribute. Upon receiving the advertisement of an attribute, the attribute broker checks to see if any callback functions have been registered for that attribute. If so, the attribute broker calls each callback function. The callback function implementation then stores the configuration attribute value in a virtual memory to be used by the system elements whenever required.

17 Claims, 5 Drawing Sheets

DYNAMIC SYSTEM CONFIGURATION USING AN OBJECT-BASED CLIENT-SERVER SYSTEM

BACKGROUND OF THE INVENTION

1. Field of Invention

The invention relates to the handling and storing of system configuration attributes. In particular, this invention is directed to enabling dynamic configuration through the storage and modification of configuration information as attributes of a server object in a client-server system.

2. Description of Related Art

Typically, system configuration is a static process, whereby the configuration is changed and the system must be restarted. In some systems, registry values are often used to store system configuration information. When one of these values changes, the network (or system) process must be shut down and restarted for the changes to take effect.

Similarly, as shown in FIG. 1, on UNIX, for example, configuration files 120 (typically found in /etc/*.conf) are often used to store configuration information for the network 110 and various system elements (or infrastructure facilities) 130,140,150 in the system 100. When one of these system elements 130,140,150 changes its configuration, the corresponding configuration file 120 is edited and the system 100 must have processes restarted for the changes to take effect.

This static nature of system configurations is because configuration information is only accessed at system startup. Configuration files 120 and registry entries are not suitable for dynamic configuration capabilities, because it is difficult to know when a change has occurred. Typically, information would need to be polled (reread) every single time the information is needed, if true dynamic configuration were to be implemented. However, because of the frequency this information is required, it is typically prohibitive to do this type of polling.

In an object-based client-server system, the client can set configuration attributes on the server object to store and modify configuration information. However, lowlevel infrastructure facilities (e.g., naming, security, file access, etc.) often require configuration information and the object code is typically built on top of this infrastructure. To avoid circular dependencies and maintain proper layering, the infrastructure facilities cannot use or be dependent upon the object code. Hence, the infrastructure code cannot access the server object to obtain the necessary configuration attributes.

SUMMARY OF THE INVENTION

This invention provides a method and apparatus to enable other system elements to obtain configuration attribute modifications from a print management system. An attribute broker may provide two methods, register and advertise, to facilitate communication of configuration changes. The register method may be called by other system elements to indicate an interest in a particular attribute. In registering interest in an attribute, the system element may provide a callback function. The attribute broker may maintain a list of all attributes that have been registered and may keep the set of callback functions for each registered attribute.

Whenever a server configuration attribute is modified, the server object may use the advertise method to provide the attribute information to any system element that has registered interest in that attribute. Upon receiving the advertisement of an attribute, the attribute broker may check to see if any callback functions have been registered for that attribute. If so, the attribute broker may call each callback function. The callback function implementation may then store the configuration attribute value in a virtual memory to be used by the system elements whenever required.

These and other features and advantages of this invention are described in or are apparent from the following detailed description of the preferred embodiments.

BRIEF DESCRIPTION OF THE DRAWINGS

The invention is described in detail with reference to the following drawings, wherein like numerals represent like elements and wherein.

DETAILED DESCRIPTION OF PREFERRED EMBODIMENTS

The following embodiments illustrate the use of an attribute broker for handling changes of system attributes in printing systems. However, the use of the invention in printing systems is only an exemplary illustration. The use of an attribute broker may be applied to any client-server system.

System configuration information contains information on particular system elements which is available to other system elements so that communication between elements is possible. This configuration information is stored in the form of attributes that define or characterize the print management system's abstract entities, or objects. Normally, in conventional systems, if configuration information is modified, the system must be restarted.

The processing of attributes in a print management system is described, for example, in U.S. patent application No. 08/976,180, entitled "FILTER INTERFACE FOR MANAGING PRINTER SYSTEM INFORMATION," filed Nov. 21, 1997, now U.S. Pat. No. 6,175,839 and U.S. patent application No. 08/966,406, entitled "DYNAMIC EXTENSION OF PRINT CAPABILITIES," filed Nov. 7, 1997, now U.S. Pat No. 6,055,063 the subject matters of which are incorporated herein by reference.

Figure 1:
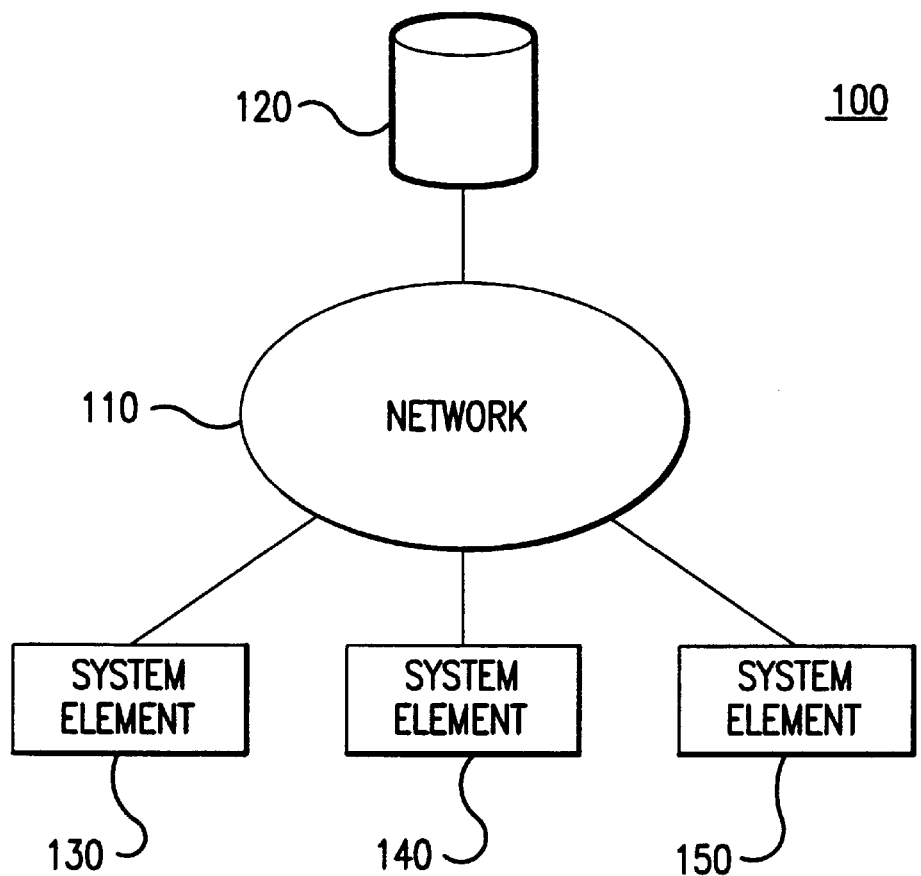
FIG. 1 is a diagram showing the conventional interaction between the network, configuration files, and system elements.
Figure 2:
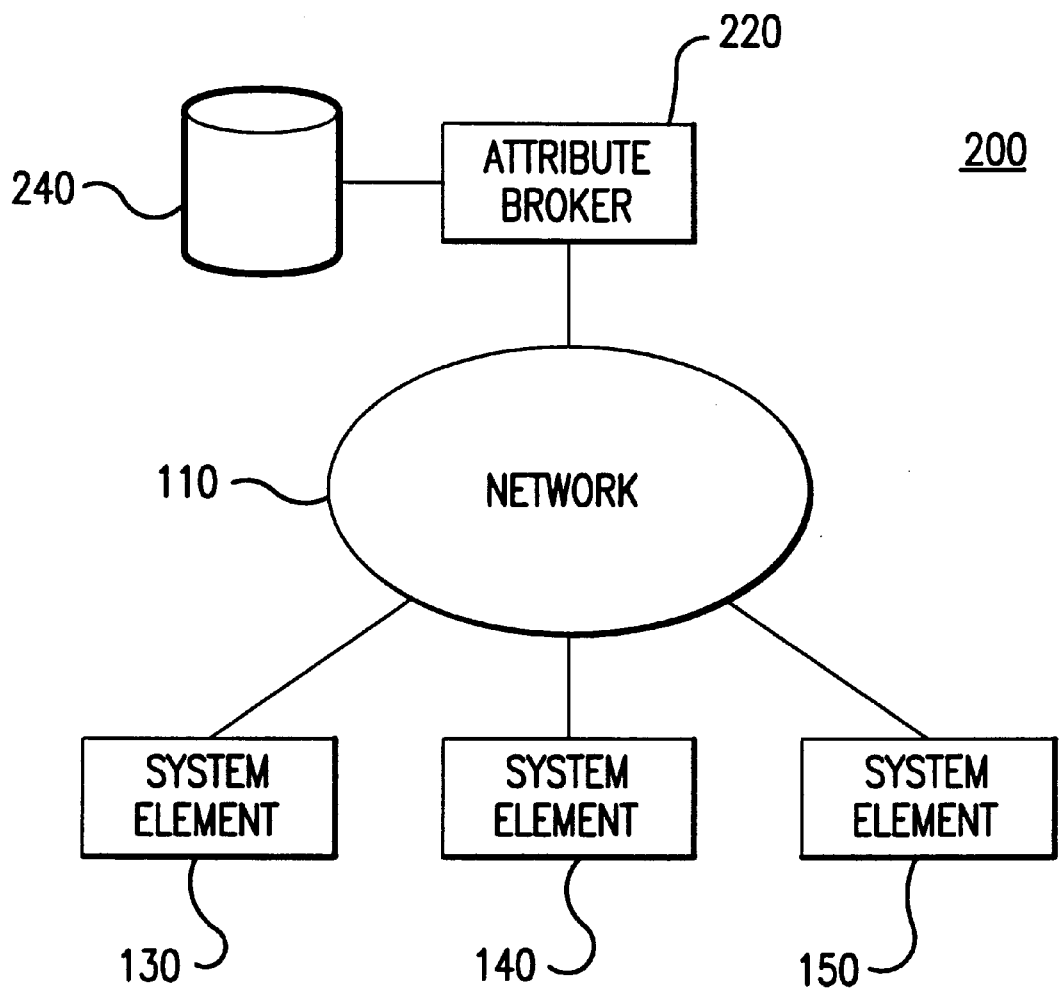
FIG. 2 is a diagram showing the interaction between the network, the attribute broker, and system elements.

FIG. 2 shows an exemplary print management system 200 using attribute broker 220. While the attribute broker 220 is shown in the figure as a single, standalone unit, the functions of the attribute broker 220 may also be distributed through individual system element control units.

When an element of the system 200, such as one of the system elements 130,140,150, changes its configuration, the configuration change is passed to the attribute broker 220 through the network 110. If one system element 130, for example, is interested in when another particular system element 140 changes its configuration, the system element 130 registers (or stores) that interest with the attribute broker 220. The system element 130 registers its interest in the configuration change of system element 140 by supplying a callback function, such a function may take the configuration information and store it in virtual memory, or write it to disk, or call some other function using it as an input parameter. The attribute broker 220 then stores the system element's 130 interest with its related callback function in the virtual memory 240. This information may also be stored in an internal storage unit of the attribute broker 220 or in an external storage unit the system element 130, for example.

The attribute broker 220 is designed to give system elements 130, 140,150 access to specific attributes without requiring a dependency on the object code or the object database. However, at the discretion of the code that maintains an attribute, whether to publicly advertise the attribute and at what times, the impetus for the attribute broker 220 is based on the need of a system element 130,140,150 to be dynamically configurable. One of the mechanisms for dynamic configuration is through server cfg-xxx attributes. However, system elements 130,140,150 cannot be dependent upon server object code. Hence, the attribute broker 220 provides a simple indirection mechanism to access to server configuration attributes without a dependency on the server interface.

With the attribute broker 220 acting as a broker between the system elements 130,140,150 and server code, the system elements 130,140,150 can have dynamic configuration using the standard PrintXchange dynamic configuration mechanism (namely "pdset -c s -x cfg-xxx=yyy <serverName>"). This simple indirection is accomplished by providing just two functions. The first function, CFG_Register(), allows any system element 130,140,150 interested in observing the specified attribute or set of attributes to register a callback function that shall be called when specified attributes are advertised. The second function, CFG_Advertise(), allows any object to advertise a specified attribute or set of attributes.

An attribute can be advertised whenever it is modified (as in the server configuration attributes), however it is at the discretion of the advertising object code as to when to publicly advertise an attribute. For example, there could be instances when only certain changes in an attribute value would be useful to advertise (e.g., server state changes to paused).

For example, if the system element 130 wants to know when the file path for the logging function for server #15 is changed, the system element 130 registers that that interest with attribute broker 220. The system element 130 provides a callback function, which sets the file path as the path to be used for the system log file, to be stored with the system element's 130 interest in the logging file path for server #15.

Any time an element of system 200 changes its configuration, it may notify the attribute broker 220 through the network 110. Attribute broker 220 then advertises this change. The attribute broker 220 checks to see if there is any interest in the change in configuration for that system element 130,140,150 (i.e., checks to see if any callback functions have been registered) in the virtual memory 240. If the attribute broker 220 determines that there has been interest registered in that particular element's configuration, the attribute broker 220 calls all of the registered callback functions registered by the interested system element 130, 140,150.

In the above example, in the system 200, the object implementation, which is the code that knows that attributes are modified, has the option to advertise that server #15's log file path has been changed by calling the attribute broker 220. The attribute broker 220 then searches through the data stored in virtual memory 240 for those system elements 130,140,150 that have registered interest in the log file path of server #15. If any of the system elements 130,140,150 are found that have registered interest in the log file path of server #15, the attribute broker 220 calls the callback functions. The interested system element 130,140,150 then receives the advertisement from attribute broker 220 and takes note of the fact that the log file path for server #15 has been changed.

If, for example, a system element 130,140,150 changes its configuration but no other system element 130,140,150 has registered an interest, the attribute broker 220, after checking in virtual memory 240, finds that no callback functions have been registered, so no action will be taken by any other system element 130,140,150.

Figure 3:
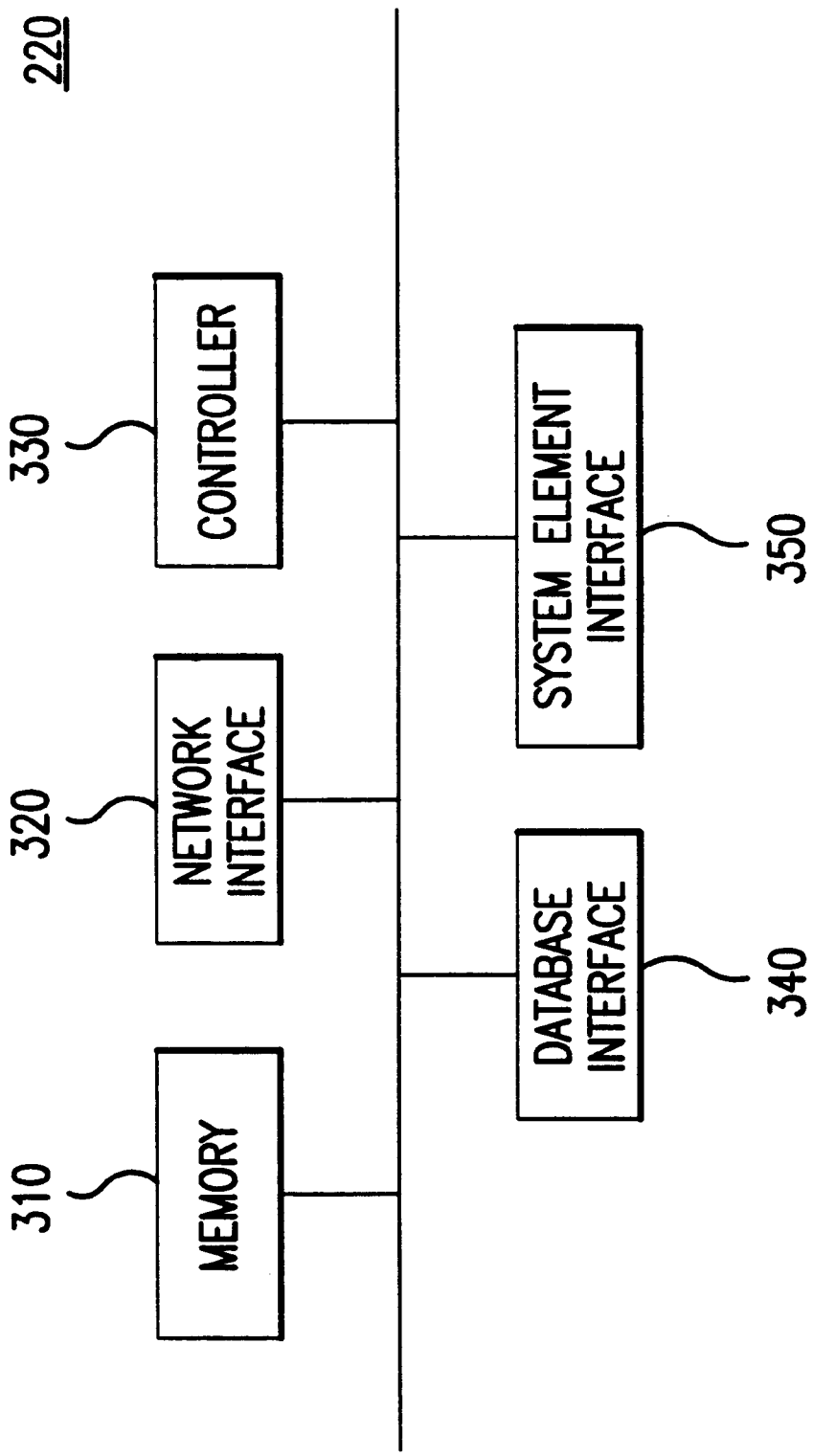
FIG. 3 is an exemplary block diagram of the attribute broker.

FIG. 3 is an exemplary block diagram of the attribute broker 220. The attribute broker 220 may include a memory 310, a network interface 320, a controller 330, a database interface 340, and a system element interface 350. When one of the system elements 130,140,150, changes its configuration, the configuration change is passed to the controller 330 through the network interface 320 and stored in the memory 310 or to the virtual memory 240 through the database interface 340. However, if the attribute broker 220 is part of a distributed system, then the configuration change is passed through system element interface 350 for storage.

If one system element 130, for example, is interested in when another particular system element 140 changes its configuration, the system element 130 registers that interest by supplying a callback function to the controller 330 through the network via the network interface 320. The attribute broker 220 then stores the system element's 130 interest with its related callback function in the virtual memory 240 or through the database interface 340.

If a system element 130,140,150 changes its configuration, it may notify the controller 330 through the network interface 320. The controller 330 checks the virtual memory 240 through the database interface 340 to see if there is any interest in the change in configuration for that system element 130,140,150. If the controller 330 determines that there has been interest registered in the particular system element's 130,140,150 configuration, the controller 330 calls all of the registered callback functions registered by the interested system element 130,140,150 through the network 110 and network interface 320.

Figure 4:
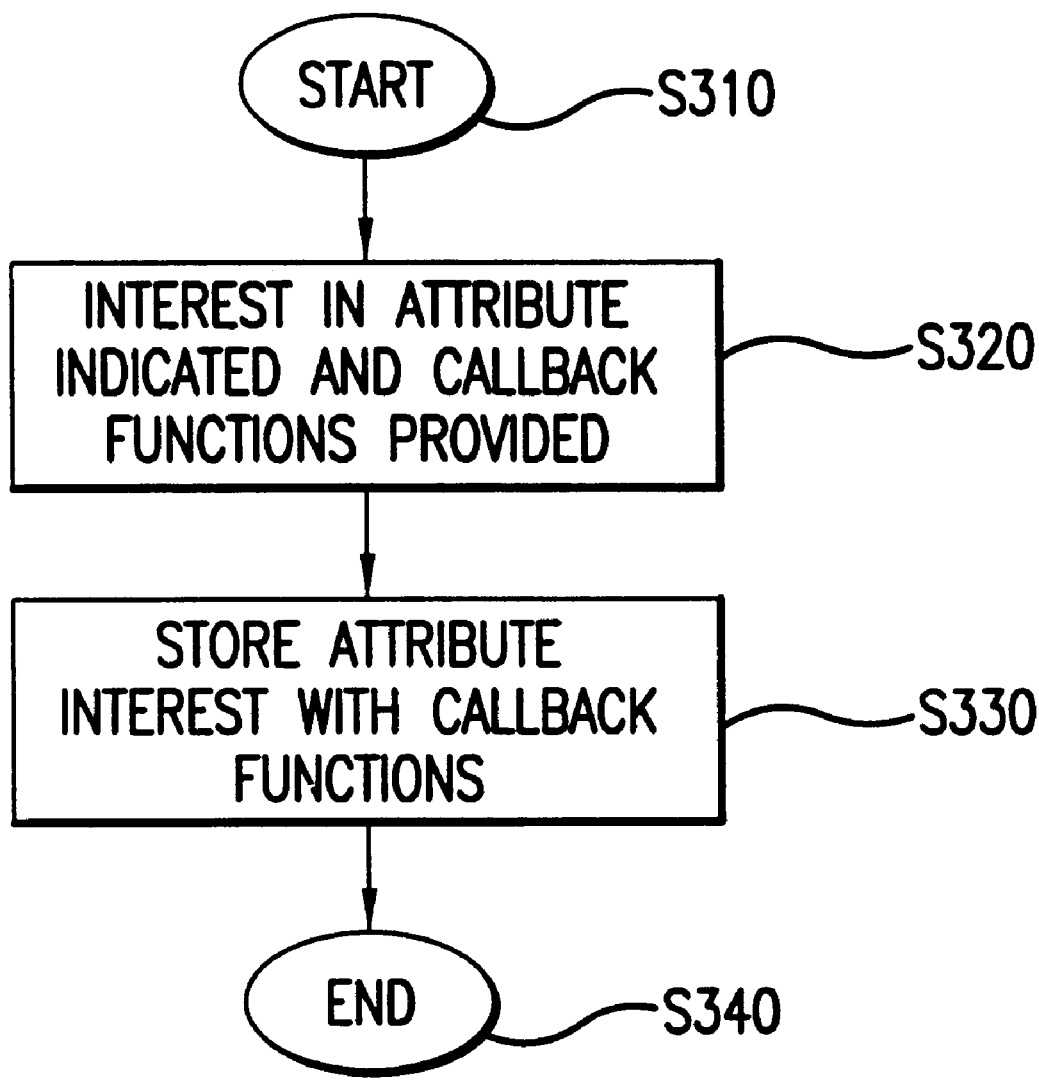
FIG. 4 is a flowchart of the registration method.

FIG. 4 is a flowchart of the registration process. Beginning at step S310, control continues to step S320. Next, at step S320, the system element 130,140,150 expresses an interest in an attribute and provides callback functions to the attribute broker 220. Then, at step S330, the attribute broker 220 stores the attribute interest with the callback functions into virtual memory 240. Control goes to step S340 and ends.

Figure 5:
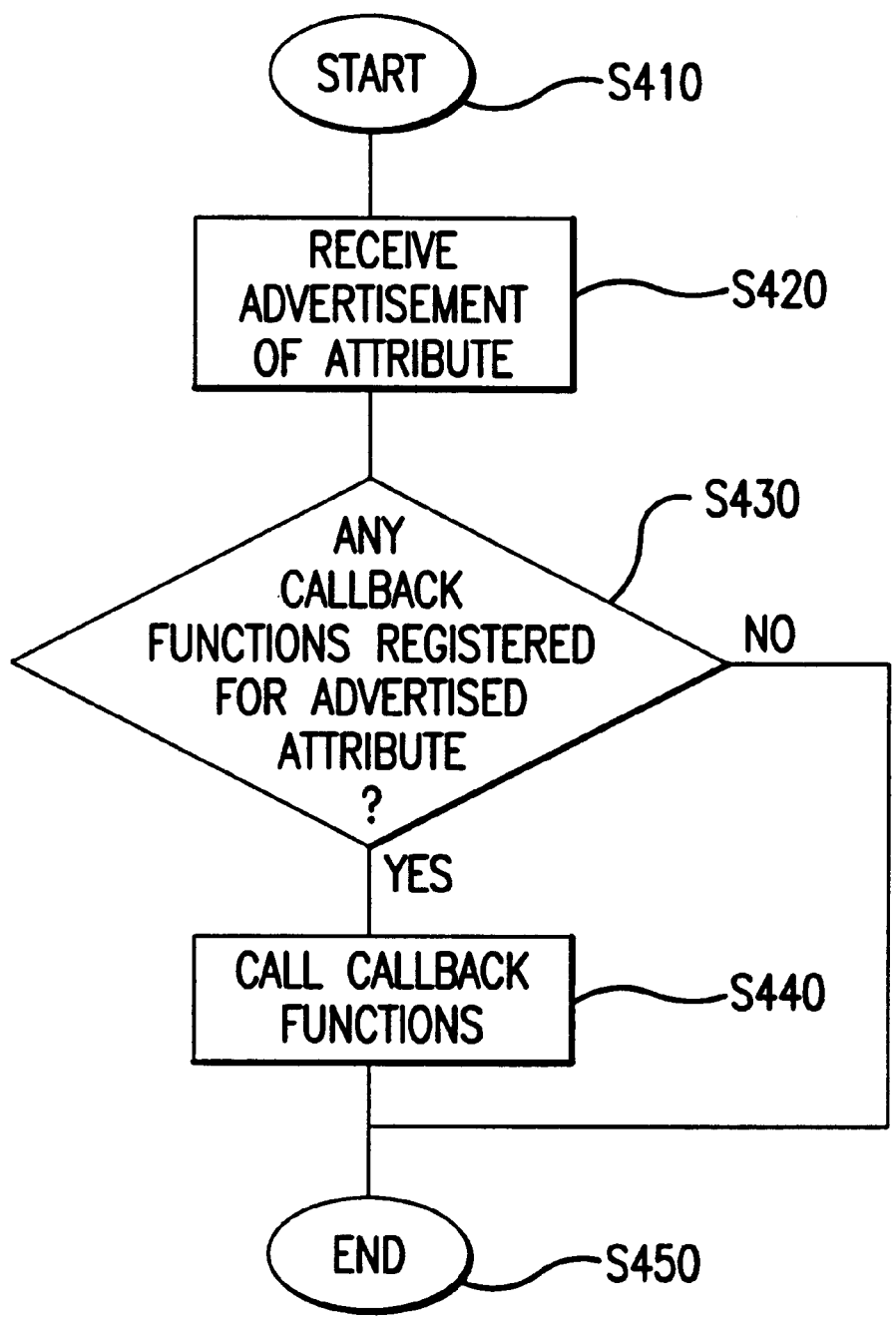
FIG. 5 is a flowchart of the advertisement method.

FIG. 5 is a flowchart of the advertising process. Beginning at step S410, control continues to step S420 where the attribute broker 220 receives an advertisement from the network 110 that a system element 130,140,150 has changed its configuration. At step S430, the attribute broker 220 determines if any callback functions have been registered for the advertised attribute in virtual memory 240. If any callback functions have been registered for the advertised attribute, control goes to step S440 and the attribute broker 220 calls the callback functions. Control then goes to step S450 and ends.

If however the attribute broker 220 determines that no callback functions have been registered for the advertised attribute in virtual memory 240, control jumps to step S450 and ends.

As shown in FIGS. 2 and 3, as well as in the example outlined above, the implementation of the attribute broker is preferably performed on a programmed general purpose computer. However, the implementation of the attribute broker can also be performed on a special purpose computer, a programmed microprocessor or microcontroller and peripheral integrated circuit elements, an ASIC or other integrated circuit, a hard-wired electronic or logic circuit, such as a discreet element circuit, a programmable logic device, such as a PLD, PLA, FGPA or PAL, or the like. In general, any device on which a finite state machine capable of implementing the flowcharts shown in FIGS. 4 and 5 and the example illustrated above, can be used to perform the implementation of the attribute broker.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A system, comprising:

a memory device;

a first system element; and an attribute broker that stores the first system element's interest in a second system element's attribute along with at least one corresponding callback function in the memory device, wherein the callback function is supplied by the first system element, the attribute broker calling each stored callback function when notified by the second system element that the second system element's attribute has been modified.

2. The system of claim 1, further comprising a network connected between the attribute broker and each system element, wherein the network notifies the attribute broker when a system element's attribute is modified.

3. The system of claim 2, wherein the attribute broker determines whether any system element has registered an interest in the modified attribute.

4. The system of claim 3, wherein the attribute broker notifies one of the system elements that have registered an interest in another system's attribute, that the attribute has been modified.

5. The system of claim 4, wherein the attribute broker notifies the system elements using one of the stored callback functions.

6. The system of claim 1, wherein the attribute is a configuration attribute.

7. A system, comprising:

a memory device;

a first system element; and an attribute broker means that stores the first system element's interest in a second system element's attribute along with at least one corresponding callback function in the memory device, wherein the callback function is supplied by the first system element, the attribute broker means calling each stored callback function when notified by the second system element that the second system element's attribute has been modified.

8. The system of claim 7, further comprising a network means connected between the attribute broker means and each system element, wherein the network means notifies the attribute broker means when a system element's attribute is modified.

9. The system of claim 8, wherein the attribute broker means determines whether any system element has registered an interest in the modified attribute.

10. The system of claim 9, wherein the attribute broker means notifies one of the system elements that have registered an interest in another system's attribute, that the attribute has been modified.

11. The system of claim 10, wherein the attribute broker means notifies the system elements using one of the stored callback functions.

12. The system of claim 7, wherein the attribute is a configuration attribute.

13. A method for storing a modification in a system element's attribute, comprising:

storing a first system element's interest in a second system element's attribute along with at least one corresponding callback function in a memory device, wherein the callback function is supplied by the first system element; and calling each stored callback function when notified by the second system element that the second system element's attribute has been modified.

14. The method of claim 13, further comprising receiving notification through a network when a system element's attribute is modified.

15. The method of claim 14, further comprising determining whether any system element has registered an interest in the modified attribute.

16. The method of claim 15, further comprising notifying one of the system elements that have registered an interest in another system element's attribute, that the attribute has been modified.

17. The method of claim 16, wherein the notifying step notifies the system element using one of the registered callback functions.

* * * * *